J. T. DALE.
CURRENT MOTOR.
APPLICATION FILED JUNE 3, 1916.
1,263,865.
Patented Apr. 23, 1918.
2 SHEETS—SHEET 1.
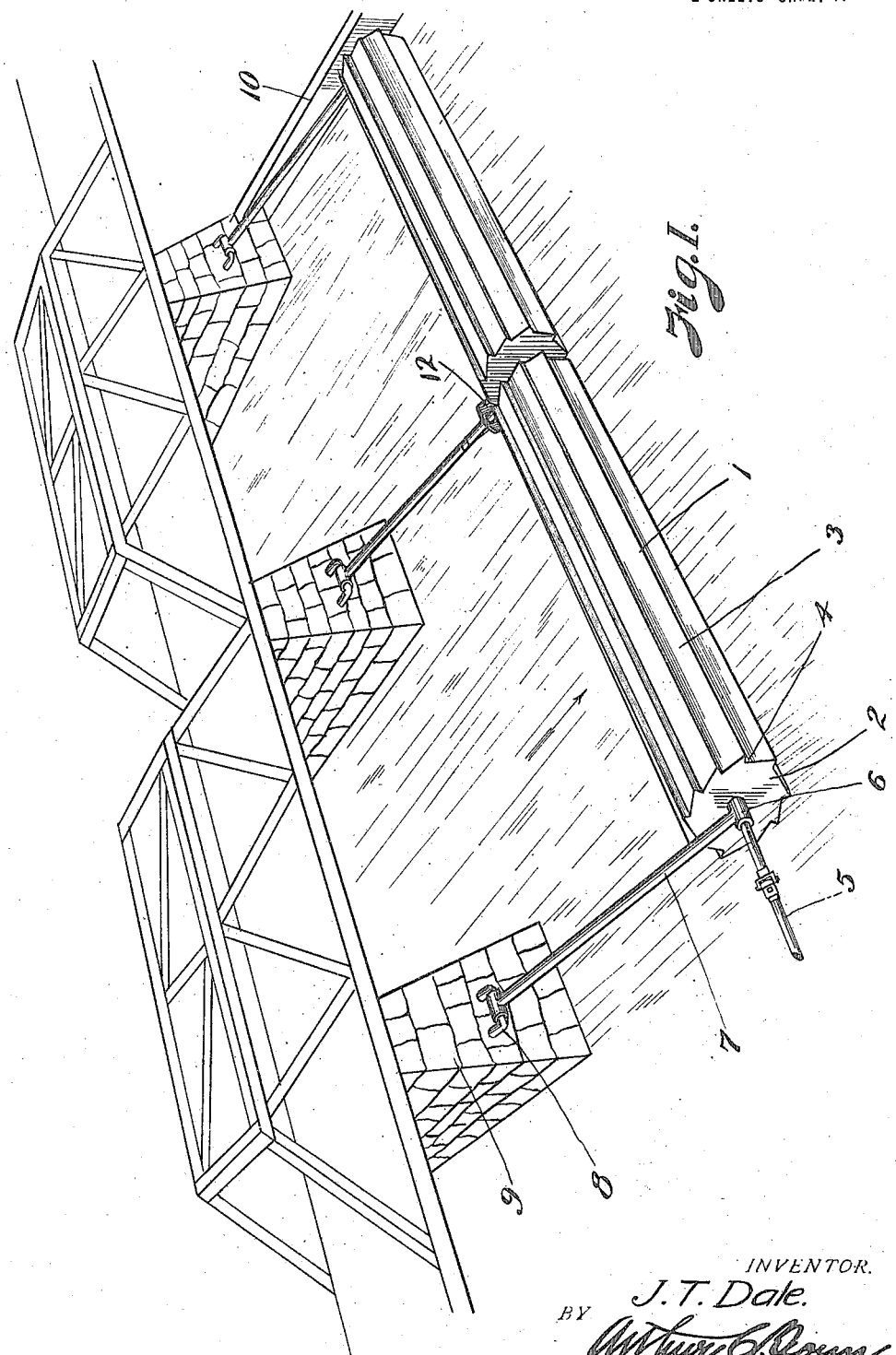
INVENTOR.
J. T. Dale.
BY
ATTORNEY.

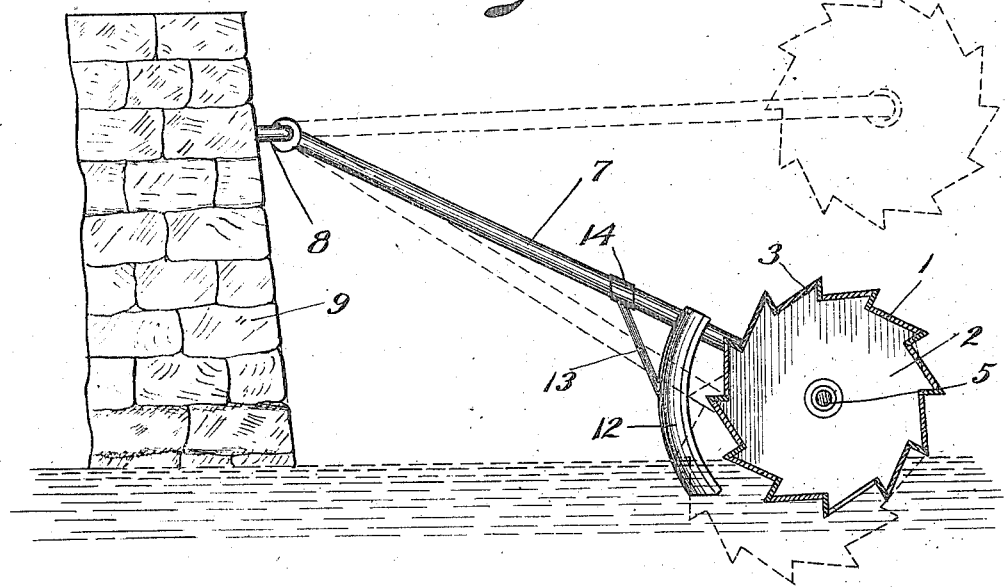
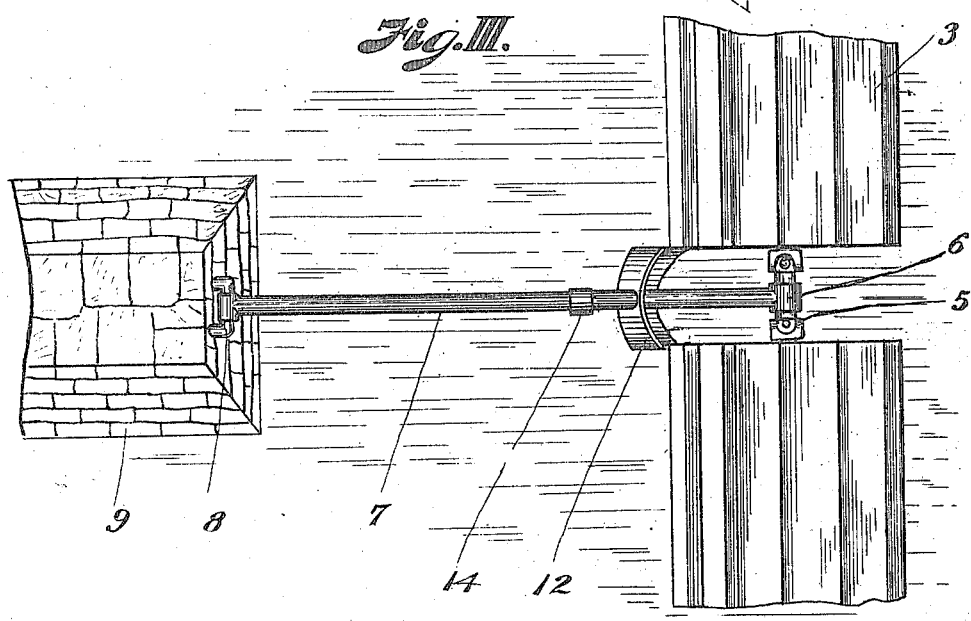

UNITED STATES PATENT OFFICE.

JAMES T. DALE, OF KANSAS CITY, KANSAS.

CURRENT-MOTOR.

1,263,865.  Specification of Letters Patent.  Patented Apr. 23, 1918.

Application filed June 3, 1916. Serial No. 101,629.

*To all whom it may concern:*

Be it known that I, JAMES T. DALE, a citizen of the United States, residing at Kansas City, in the county of Wyandotte and State of Kansas, have invented certain new and useful Improvements in Current-Motors; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.
My invention relates to a current motor and more particularly to a type of motor that is anchored in a stream and turned by the force of the current to operate a driving shaft, the principal object of the present invention being to float a motor wheel of this character on the top of a stream, so that it will operate as an undershot wheel under force of the current supplemented and which will automatically adjust itself to the rise and fall of the stream.

It is also an object of the invention to provide a wheel of this character which may be made in sections with the sections properly spaced and the spaces covered to effect a dam across the entire wheel, and thereby secure the greatest possible efficiency from the current and dam.

In accomplishing these and other objects of the invention, I have provided improved details of structure, the preferred forms of which are illustrated in the accompanying drawings, wherein:—

Figure I is a perspective view of a current motor embodying my improvements, particularly illustrating a preferred form of anchor for the motor.

Fig. II is a transverse section of the motor, the dotted lines indicating the automatic adjustment with the rise and fall of the stream.

Fig. III is a plan view of a part of the motor.

Referring more in detail to the drawings:—
1 designates a water wheel comprising the end members 2, and the vaned periphery 3, the ends and the periphery of the wheel being sealed to form a water tight structure and the base ends of the vanes 4 being inset in the end members of wheel to form shoulders that effectually stiffen the vanes so they may withstand the combined force from the current and weight of water in the dam above the motor.

Extending through the end members 2 and rotatably mounting the wheel is a shaft 5, and located on the shaft, at each end of the wheel, are bearings 6 of anchor rods 7 that are pivotally mounted on brackets 8, on piers 9, which may be the piers of a bridge as shown, or may be installed particularly for carrying the current motor.

As it is inadvisable and not economical to provide a single wheel of a length to extend entirely across a stream, or the effective portion of a stream, I prefer to construct the motor in several sections, forming several independent water wheels, the separate wheels being separated sufficiently to interpose the bearings 6 therebetween in order that anchors may be located at sufficiently close intervals to properly hold the motor and obviate twisting strain thereon, it is apparent that there may be as many separate wheels as may be necessary or desirable.

The entire wheel may be confined between walls 10, so that a sluice like arrangement is provided for the motor that will obviate the flow of water to the ends of the water wheel.

In order to properly dam the stream above the wheel and thereby secure the full effectiveness of the current, I provide each of the rods 7 with a deflector 12, which is preferably curved in order to deflect water downwardly below the wheel and may be braced from the rods by an arm 13, having a collar 14 that is mounted on the rod at the upstream side of the deflector.

Assuming that the motor is constructed and assembled as described, and mounted in a sluice as illustrated in Fig. I, when the wheel is in place, it dams the stream so that the force of the current is increased by the weight of the water in the dam. The water in the stream, under the force of the current, supplemented by the confinement back of the wheel, passes beneath the wheel and, engaging the vanes 4, rotates the wheel and the shaft to which the wheel is connected and upon which the wheel is mounted, so that when the shaft is connected with a suitable transmission (not shown) it may operate machinery with which the motor may be associated.

By providing the anchor rods with the deflectors noted, passages for water between the wheels are obviated, so that the entire outlet must be beneath the wheels and the entire force of the stream applied thereto.

It is apparent that with the anchor rods pivotally mounted on their brackets as the stream rises and falls, the wheel will rise and fall with and revolve on the surface of the stream, the damming effect being present and the motor being operated by the combined force of the current and weight of the water back of the dam.

Having thus described my invention, what I claim as new therein and desire to secure by Letters-Patent, is:—

1. A current motor comprising a plurality of anchor members, a shaft journaled in ends of said members, water wheels fixed to the shaft between the anchor members and deflectors carried by the anchor members to prevent the flow of water between the wheels.

2. A current motor comprising a plurality of anchor members, each having one end pivotally mounted on a bracket, a continuous, flexible shaft rotatably mounted on the free ends of said anchor members, deflectors fixed to said anchor members to prevent flow of water between the wheels and a power transmitting shaft operatively attached to the flexible shaft, for the purpose set forth.

In testimony whereof I affix my signature.

JAMES T. DALE.

Copies of this patent may be obtained for five cents each, by addressing the "Commissioner of Patents, Washington, D. C."